Patented Oct. 24, 1933

1,931,491

UNITED STATES PATENT OFFICE

1,931,491

PRODUCTION OF SULPHONIC ACIDS

Hans Haussmann, Mannheim, Germany, assignor to I. G. Farbenindustrie Aktiengesellschaft, Frankfort-on-the-Main, Germany, a corporation of Germany No Drawing. Application May 17, 1928, Serial No. 278,646, and in Germany June 4, 1927

9 Claims. (Cl. 260—112)

This invention relates to the production of sulphonic acids.

I have found that true sulphonic acids can be produced from unsaturated hydrocarbons of the open chain aliphatic or cycloaliphatic series or their derivatives or mixtures thereof in a simple manner by treating the said substances with sulphonating agents stronger than concentrated sulphuric acid which are reduced in their activity, as for example by esterification or by the formation of a so-called "onium" compound, namely oxonium, ammonium or sulphonium compounds or the like. Thus the sulphonation can be performed either with sulphonating agents, such as chlorsulphonic or pyrosulphuric acid in the presence of such compounds which are known to form therewith additive products of the kind mentioned or with esters of chlorsulphonic acid or substances furnishing the same, which compounds, for the sake of brevity, will be referred to in the following as compounded sulphonating agents.

As examples of substances furnishing the aforesaid additive products with the sulphonating agents may be mentioned, for example, diethyl sulphide, diethyl ether, acetic ethyl ester, acetic methyl ester, diethylene oxid, pyridine and the like. In some cases the sulphonation is accompanied to some degree by another kind of substitution of the initial materials, for instance, the formation of a sulphonic acid containing chlorine, for example when tetrahydrobenzene is treated with chlorsulphonic acid in the presence of ether. In such cases the halogen may, if desired, be easily removed, or replaced by other groups, by treatment with chemical agents such as water, alkalis, amines and the like.

It will be understood that with the term "true sulphonic acids" only such compounds are referred to in which the sulphuric atom is directly linked to a C atom. The process according to the present invention can be performed either by producing at first the said ammonium, oxonium or sulphonium compound, or the chlorsulphonic acid ester, and then acting with these on the unsaturated compounds, or the unsaturated compounds can be treated with sulphonating agents in the presence of components, capable of forming "onium" compounds or chlorsulphonic esters with the sulphonating agent.

If unsaturated crude fatty acids such as those derived from fish oil or the like are treated in the manner described above the by-products, occurring in the form of unsulphonated fatty acids, can be removed, if desired, for example by treating the neutralized reaction product with a pulp of gypsum and filtering off by suction the insoluble calcium salts obtained thereby together with the pulp. The by-products can be recovered by treating the mass with soda or a similar alkaline agent.

The process of sulphonating according to the present invention is applicable to aliphatic carboxylic acids or their esters, containing one or more hydroxyl groups, such as ricinoleic acid, only when the sulphonating agent is employed in excess of the amount necessary for the sulphonation. On the other hand the process according to the present invention provides for the production of true sulphonic acids without any decomposition of the initial material employed in contrast to a process performed with the aid of free strong sulphonating agents and in contrast to the production of sulphuric esters which only are obtained when working with strong sulphonating agents under conditions avoiding any decomposition of the initial materials.

The following examples will further illustrate the nature of the said invention which however is not limited thereto. The parts are by weight.

Example 1

70 parts of oleic acid are stirred, at 80° C. with 72 parts of chlorsulphonic ethyl ester, prepared from sulphuryl chlorid and alcohol, or from ethylene and chlorsulphonic acid. The reaction is complete in about 2 hours. The reaction mixture is diluted with water and, after the addition of 10 parts of sulphuric acid, is boiled under a reflux condenser until the reaction product will dissolve to a clear solution in water. The resulting sulphonic acid may either be employed as such, or after neutralization and the removal of inorganic salts, if desired. The reaction apparently proceeds according to the following equations:

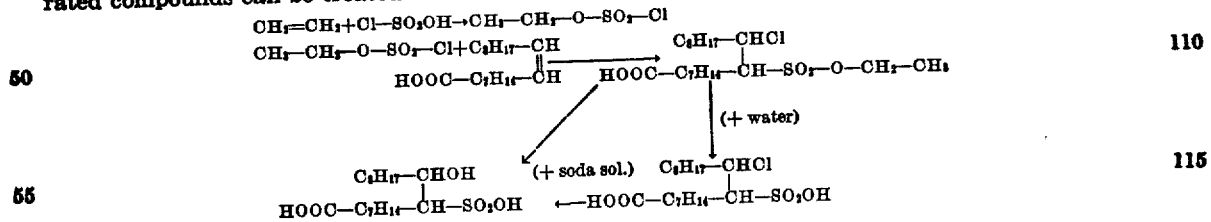

Example 2

140 parts of chlorsulphonic acid are added to 100 parts of ethyl ether, cooling means being applied. 282 parts of oleic acid are gradually added, and the temperature is then raised to about 20° C. During the reaction it is advisable to remove from the mixture any hydrogen chlorid that may be formed, in any known or suitable way, for example by passing a dry current of air, which has been saturated with ether, through the reaction mixture. At the end of 24 hours the sulphonation mass is poured into water, and the ether is eliminated. A sulphonated oleic acid which is soluble in water and stable towards acids, is obtained. The reaction apparently proceeds according to the following equations:

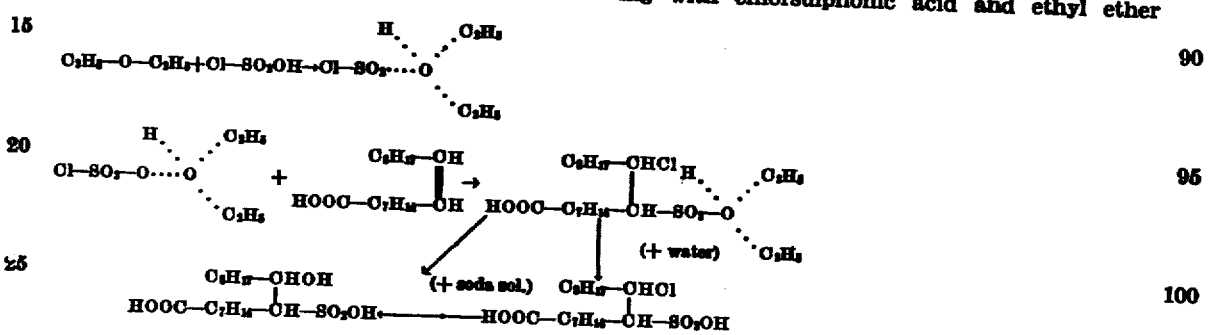

Example 3

140 parts of ethyl ether are treated with 140 parts of chlorsulphonic acid, cooling means being employed, whereupon 82 parts of tetrahydrobenzene, dissolved in 140 parts of ether, are dropped in, the mixture being kept well cooled. When this has been done, the temperature is raised to about 20° C. and the mixture is stirred at that temperature for about 24 hours. It is then treated with water, at the same time being kept cool, and then rendered exactly neutral with sodium bicarbonate, and concentrated.

In the place of tetrahydrobenzene rubber or balata or similar natural products can be employed, highly colloid, water-soluble products being obtained.

Example 4

89 parts of fuming sulphuric acid containing 45 percent of sulphuric anhydrid are slowly introduced into 75 parts of ethyl ether at a temperature of from 5° to 10° C., whereupon, at the same temperature, 130 parts of oleic acid are added. After slowly heating to 35° C. stirring is continued at the same temperature for about 24 hours, whereupon the mass is neutralized and the ether is distilled off. A sulphonated oleic acid is obtained which is stable even against boiling with strong acids. The reaction apparently proceeds according to the following equations:

What I claim is:—

1. The process of producing true sulphonic acids of organic compounds, which comprises acting with an "onium" compound of a sulphonating agent stronger than concentrated sulphuric acid on an unsaturated aliphatic compound, the quantity of sulphonating agent being greater than one molecular proportion per molecular proportion of the aliphatic compound if the latter contains a hydroxyl group.

2. The process of producing true sulphonic acids of organic compounds, which comprises acting with chlorsulphonic acid and ethyl ether upon an unsaturated aliphatic compound, the quantity of sulphonating agent being greater than one molecular proportion per molecular proportion of the aliphatic compound if the latter contains a hydroxyl group.

3. The process of producing true sulphonic acids of organic compounds which comprises acting upon an unsaturated aliphatic acid with an "onium" compound of a sulphonating agent stronger than concentrated sulphuric acid, the quantity of sulphonating agent being greater than one molecular proportion per molecular proportion of the aliphatic compound if the latter contains a hydroxyl group.

4. The process of producing true sulphonic acids of organic compounds which comprises acting upon an unsaturated higher aliphatic acid with chlorsulphonic acid and ethyl ether, the quantity of sulphonating agent being greater than one molecular proportion per molecular proportion of the aliphatic compound if the latter contains a hydroxyl group.

5. The process of producing true sulphonic acids of organic compounds which comprises acting upon an unsaturated higher aliphatic acid substituted by at least one hydroxyl group, with an "onium" compound of a sulphonating agent stronger than concentrated sulphuric acid, the quantity of sulphonating agent being greater than one molecular proportion per molecular proportion of the aliphatic compound if the latter contains a hydroxyl group.

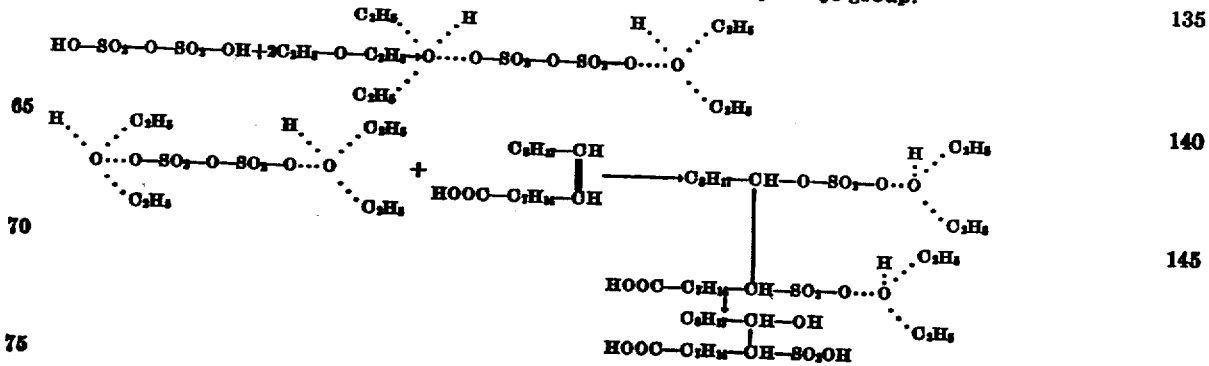

6. As new articles of manufacture, true sulphonic acids of non-aromatic organic compounds containing at least 6 carbon atoms and corresponding to the general formula

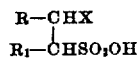

in which R and R₁ are aliphatic radicles, or one of them is hydrogen, and X is hydroxy or halogen.

7. The process of producing true sulphonic acids of organic compounds which comprises acting with the components of an "onium" compound of a sulphonating agent, stronger than concentrated sulphuric acid, upon an unsaturated aliphatic compound, the quantity of sulphonating agent being higher than one molecular proportion per each molecular proportion of the aliphatic compound if the latter contains a hydroxyl group.

8. As new articles of manufacture, water-soluble true sulphonic acids of a rubber of natural origin, containing at least one sulphonic group for each rubber molecule.

9. As a new article of manufacture, a water-soluble true sulphonic acid of rubber, containing at least one sulphonic group for each rubber molecule.

HANS HAUSSMANN.

Certificate of Correction

Patent No. 1,931,491.            October 24, 1933.

HANS HAUSSMANN

It is hereby certified that errors appear in the printed specification of the above numbered patent requiring correction as follows: Page 2, line 16, the right hand side of the equation should read:

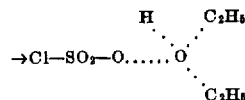

and in line 21, the upper part of the right hand formula should read:

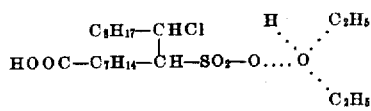

instead of as shown in the patent; and that the said Letters Patent should be read with these corrections therein that the same may conform to the record of the case in the Patent Office.

Signed and sealed this 1st day of May, A. D. 1934.

[SEAL]            BRYAN M. BATTEY,
*Acting Commissioner of Patents.*

6. As new articles of manufacture, true sulphonic acids of non-aromatic organic compounds containing at least 6 carbon atoms and corresponding to the general formula $$R-\underset{R_1-\overset{|}{C}HSO_3OH}{\overset{}{C}HX}$$

in which R and $R_1$ are aliphatic radicles, or one of them is hydrogen, and X is hydroxy or halogen.

7. The process of producing true sulphonic acids of organic compounds which comprises acting with the components of an "onium" compound of a sulphonating agent, stronger than concentrated sulphuric acid, upon an unsaturated aliphatic compound, the quantity of sulphonating agent being higher than one molecular proportion per each molecular proportion of the aliphatic compound if the latter contains a hydroxyl group.

8. As new articles of manufacture, water-soluble true sulphonic acids of a rubber of natural origin, containing at least one sulphonic group for each rubber molecule.

9. As a new article of manufacture, a water-soluble true sulphonic acid of rubber, containing at least one sulphonic group for each rubber molecule.

HANS HAUSSMANN.

Certificate of Correction

Patent No. 1,931,491. October 24, 1933.

HANS HAUSSMANN

It is hereby certified that errors appear in the printed specification of the above numbered patent requiring correction as follows: Page 2, line 16, the right hand side of the equation should read:

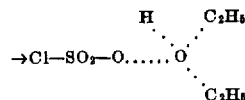

and in line 21, the upper part of the right hand formula should read:

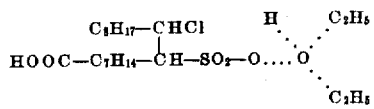

instead of as shown in the patent; and that the said Letters Patent should be read with these corrections therein that the same may conform to the record of the case in the Patent Office.

Signed and sealed this 1st day of May, A. D. 1934.

[SEAL]

BRYAN M. BATTEY,
*Acting Commissioner of Patents.*

Certificate of Correction

Patent No. 1,931,491. October 24, 1933.

HANS HAUSSMANN

It is hereby certified that errors appear in the printed specification of the above numbered patent requiring correction as follows: Page 2, line 16, the right hand side of the equation should read:

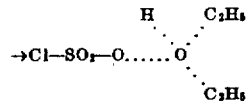

and in line 21, the upper part of the right hand formula should read:

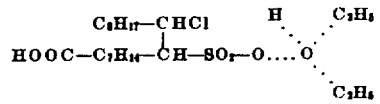

instead of as shown in the patent; and that the said Letters Patent should be read with these corrections therein that the same may conform to the record of the case in the Patent Office.

Signed and sealed this 1st day of May, A. D. 1934.

[SEAL] BRYAN M. BATTEY,
*Acting Commissioner of Patents.*